United States Patent
Reierson et al.

(10) Patent No.: US 6,821,944 B2
(45) Date of Patent: Nov. 23, 2004

(54) COMPOSITIONS OF ALKANOLAMINE SALTS OF ALKYL PHOSPHATE ESTERS

(75) Inventors: Robert Lee Reierson, Princeton Junction, NJ (US); Pascal Jean-Claude Herve, West Windsor, NJ (US); Subhash Soman, Charlotte, NC (US); Ronny Jon Eng, Old Bridge, NJ (US)

(73) Assignee: Rhodia, Inc., Cranbury, NJ (US)

( * ) Notice: Subject to any disclaimer, the term of this patent is extended or adjusted under 35 U.S.C. 154(b) by 0 days.

(21) Appl. No.: 10/161,057

(22) Filed: Jun. 3, 2002

(65) Prior Publication Data

US 2003/0027742 A1 Feb. 6, 2003

Related U.S. Application Data

(60) Provisional application No. 60/295,668, filed on Jun. 4, 2001.

(51) Int. Cl.[7] ............... C11D 1/34; C11D 3/36; C11D 7/36
(52) U.S. Cl. ............. 510/467; 510/122; 510/137; 510/138; 510/158; 510/159; 510/499
(58) Field of Search ................... 510/122, 137, 510/138, 158, 159, 467, 499

(56) References Cited

U.S. PATENT DOCUMENTS

| | | | | |
|---|---|---|---|---|
| 4,139,485 A | | 2/1979 | Imokawa et al. | 252/135 |
| 4,191,666 A | * | 3/1980 | Chabert et al. | 252/545 |
| 4,479,893 A | * | 10/1984 | Hirota et al. | 252/542 |
| 4,753,754 A | | 6/1988 | Messenger et al. | 252/354 |
| 5,139,781 A | | 8/1992 | Birtwistle et al. | 424/401 |
| 5,463,101 A | | 10/1995 | Reierson | 558/110 |
| 5,550,274 A | | 8/1996 | Reierson | 558/110 |
| 5,554,781 A | | 9/1996 | Reierson | 558/110 |

FOREIGN PATENT DOCUMENTS

| | | | |
|---|---|---|---|
| DE | 1567232 | 10/1966 | |
| EP | 0 675 076 A2 | 10/1995 | C01B/25/24 |
| EP | 0909786 A1 | 4/1999 | |
| EP | 1221474 A1 | 7/2002 | |
| WO | WO00/31220 | 6/2000 | |
| WO | WO 01/10991 | 2/2001 | C11D/1/94 |

OTHER PUBLICATIONS

International Search Report for corresponding PCT Application No. PCT/US02/17243.

* cited by examiner

Primary Examiner—Gregory R. Del Cotto
(74) Attorney, Agent, or Firm—Ohlandt, Greeley, Ruggiero & Perle

(57) ABSTRACT

Disclosed are pumpable surfactant compositions of alkanolamine salts of alkyl phosphate esters. The compositions have a solids content of about 60% by weight or more. Alkanolamines useful in preparation of the alkyl phosphate ester salts of the compositions of the present invention have the following formula III:

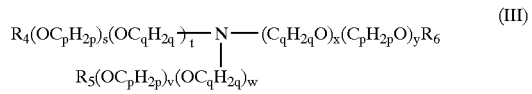

wherein $R_4$ to $R_6$ are, individually, hydrogen or $C_{1-8}$, linear or branched alkyl, alkenyl, alkaryl or aralkyl hydrocarbon moieties, which optionally may contain carbocyclic rings. At least one of the amine substituents is different from the other two. For at least one of the three substituents on the amine nitrogen, the sum of s and t (s+t) or v and w (v+w) or x and y (x+y) is equal to or greater than 1 and the corresponding R ($R_4$, $R_5$ or $R_6$) is hydrogen. The subscripts p and q, individually, may be the same or different and are integers from 2 to 4. The subscripts s, t, v, w, x, and y, individually, may be the same or different and are integers of from 0 to 10, with the proviso that the sum of all six of the subscripts is less than or equal to 12.

4 Claims, No Drawings

COMPOSITIONS OF ALKANOLAMINE SALTS OF ALKYL PHOSPHATE ESTERS

This application claims priority from U.S. Provisional Patent Application Ser. No. 60/295,668, Filed Jun. 4, 2001.

BACKGROUND OF THE INVENTION

1. Field of the Invention

This invention relates to pumpable, surfactant compositions of alkanolamine salts of alkyl phosphate esters. More particularly, this invention relates to readily pumpable, concentrated compositions of high solids content of alkanolamine salts of alkyl phosphate esters.

2. Description of Related Art

Surfactants and mixtures of surfactants are employed in a variety of industrial, commercial and domestic applications. Often, there is a need for a surfactant to be in a pumpable or fluid form for addition to formulations. Such a form is convenient and affords cost savings in handling and storage as well as ease and convenience in formulating products therewith. It is desirable for the surfactant to be available in such form in as high a concentration or proportion of surfactant or active ingredient as possible.

There are difficulties in using alkyl phosphate ester compositions of high solids content. Such compositions can be rigid or immovable, non-flowable or non-pumpable gels rather than easily handled fluid solutions. Further, phase separation can occur during production or subsequent storage of such compositions. In most instances, it has been impossible to effectively produce fluid or pumpable phosphate ester salt compositions above about 30 to 40% by weight active ingredient in water without the use of organic solvents or other co-surfactants or above about 60 wt % with their use.

To address these difficulties, various approaches have been attempted. U.S. Pat. Nos. 4,753,754 and 5,139,781 disclose the use of a mixture of different surfactants. Another approach has been to formulate aqueous solutions of such surfactants with generally large amounts of alcohols or other solvents, such as propylene glycol, dipropylene glycol or ethanol, which act as thinners and solubilizing agents thereby lowering the viscosity of the solution and inhibiting the formation of a non-flowable gel. However, for preparation of many formulations, it is not desirable to employ surfactant mixtures; in fact, their use can unnecessarily complicate the formulation process. In cosmetic or personal care product formulations, there may be a need to avoid the use of alcohol or other organic solvents. Alternately, a water-free composition may be desired.

Moreover, the use of cosurfactant compounds such as alkyl sulfates or sulfonate salts is problematic since they impart undesirable and irritating side effects as disclosed in WO 01/10991 and diminish desirable properties of the phosphate surfactants.

It would be desirable to have surfactant compositions of high concentrations of alkyl phosphate ester salts in a stable, pumpable liquid form. It would further be desirable to have surfactant compositions that do not require the presence of co-surfactants or large amounts of organic solvents or water, adulterating additives, or performance reducing residual components.

SUMMARY OF THE INVENTION

An object of this invention is to provide such stable, pumpable or flowable surfactant compositions of high solids content, e.g. about 60 wt % or more, that are pumpable at typical industrial use temperatures.

Alkyl phosphate ester alkanolamine salts useful in the compositions of the present invention include those of the monoalkyl salts of formula I and those of the dialkyl salts of formula II:

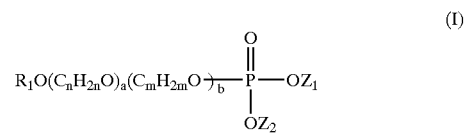

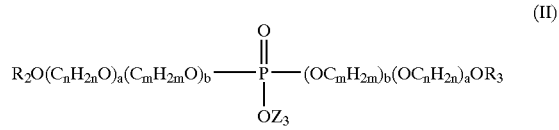

$R_1$ to $R_3$ are, individually, $C_{8-22}$ linear or branched alkyl, alkenyl, alkaryl or aralkyl hydrocarbon moieties, which optionally may contain carbocyclic rings. The subscripts a and b, individually, may be the same or different and are integers from 0 to 8 with the proviso that the sum of the a and b is less than or equal to 8. The subscripts n and m, individually, may be the same or different and are integers of from 2 to 4. $Z_1$ and $Z_2$ are, individually, hydrogen, alkali metal, ammonia or an alkanolamine according to formula III below with the proviso that at least one of $Z_1$ and $Z_2$ must be an alkanolamine according to formula III below. $Z_3$ is an alkanolamine according to formula III below.

Alkanolamines useful in preparation of the alkyl phosphate ester salts of the present invention have the following formula III:

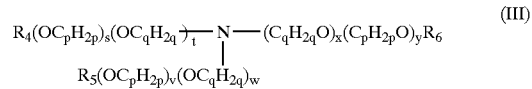

$R_4$ to $R_6$ are, individually, hydrogen or $C_{1-8}$, linear or branched alkyl, alkenyl, alkaryl or aralkyl hydrocarbon moieties, which optionally may contain carbocyclic rings. At least one of the three amine substituents is different from the other two. For at least one of the three substituents on the amine nitrogen, the sum of s and t (s+t) or v and w (v+w) or x and y (x+y) is equal to or greater than 1 and the corresponding R ($R_4$, $R_5$ or $R_6$) is hydrogen. The subscripts p and q, individually, may be the same or different and are integers from 2 to 4. The subscripts s, t, v, w, x, and y, individually, may be the same or different and are integers of from 0 to 10, with the proviso that the sum of all six subscripts is less than or equal to 12.

DETAILED DESCRIPTION OF THE INVENTION

The alkyl phosphate ester alkanolamine salts of the present invention permit the formulation of surfactant compositions of unusually high solids content, i.e. about 60 wt % or more.

Alkyl phosphate ester alkanolamine salts useful in the compositions of the present invention include those of the monoalkyl salts of formula I and those of the dialkyl salts of formula II:

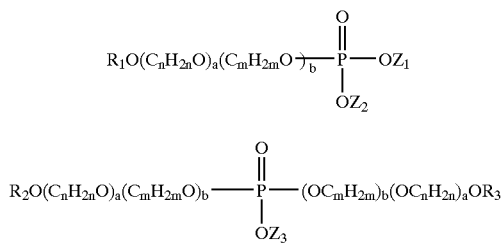

(I)

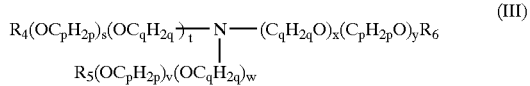

(II)

$R_1$ to $R_3$ are, individually, $C_{8-22}$ linear or branched alkyl, alkenyl, alkaryl or aralkyl hydrocarbon moieties, which optionally may contain carbocyclic rings. The subscripts a and b, individually, may be the same or different and are integers from 0 to 8 with the proviso that the sum of the a and b is less than or equal to 8. The subscripts n and m, individually, may be the same or different and are integers of from 2 to 4. $Z_1$ and $Z_2$ are, individually, hydrogen, alkali metal, ammonia or an alkanolamine according to formula III below with the proviso that at least one of $Z_1$ and $Z_2$ must be an alkanolamine according to formula III below. $Z_3$ is an alkanolamine according to formula III below.

Alkanolamines useful in the preparation of alkyl phosphate ester salts of the present invention have the following formula III:

$$R_4(OC_pH_{2p})_s(OC_qH_{2q})_t\!-\!N\!-\!(C_qH_{2q}O)_x(C_pH_{2p}O)_yR_6$$
$$|$$
$$R_5(OC_pH_{2p})_v(OC_qH_{2q})_w$$

(III)

$R_4$ to $R_6$ are, individually, hydrogen or $C_{1-8}$, linear or branched alkyl, alkenyl, alkaryl or aralkyl hydrocarbon moieties, which optionally may contain carbocyclic rings. At least one of the three amine substituents is different from the other two. For at least one of the three substituents on the amine nitrogen, the sum of s and t (s+t) or v and w (v+w) or x and y (x+y) is equal to or greater than 1 and the corresponding R ($R_4$, $R_5$ or $R_6$) is hydrogen. The subscripts p and q, individually, may be the same or different and are integers from 2 to 4. The subscripts s, t, v, w, x, and y, individually, may be the same or different and are integers of from 0 to 10, with the proviso that the sum of all six is less than or equal to 12.

It is understood, for purposes of representation of the salt, that Z1, Z2 and Z3 may be bound, as shown, particularly when Z1 or Z2 is a hydrogen, or dissociated as an ion pair in which the Z1, Z2 or Z3 would be positively charged and the corresponding oxygen would be negatively charged with the negative charge(s) delocalized among the unbound (to Z1, etc.,) oxygens through the phosphorus center. For the alkanolamine (and ammonia), the positive charge would result from protonation of the amine nitrogen by the hydrogen ion dissociated from the acid phosphate, as exemplified in formulae IV and V, below.

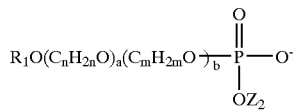

(IV)

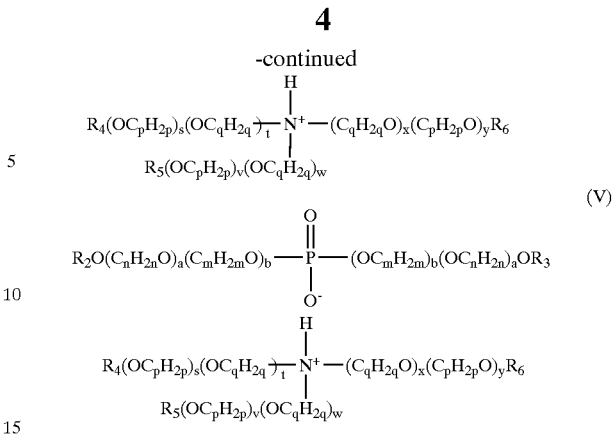

(V)

Preferred alkanolamines include the following: diethanolisopropanolamine, diglycoldiisopropanolamine,(2-(2-hydroxypropoxy)ethyl)diethanolamine, dimethylisopropanolamine, dibutylisopropanolamine, N-(2-hydroxypropyl)morpholine, methyldiethanolamine, ethyldiethanolamine, di(2-hydroxyethyl)aniline, di(2-hydroxyethyl)toluidine, di(2-hydroxyethyl)benzylamine, diethanolisopropylamine, and N-hydroxyethylimidazoline.

Pumpable surfactant compositions of this invention are characterized by a low level of residual phosphoric acid and residual alcohol. Pumpable surfactant compositions of this invention are produced from alkyl phosphate ester compositions high in monoalkyl phosphates relative to dialkyl phosphates, i.e., a molar ratio of mono- to di- alkyl phosphate esters of equal to or greater than 60:40, preferably 80:20 or greater and more preferably greater than 90:10. The phosphate ester compositions of low residual phosphoric acid and residual alcohol content and high monoalkyl phosphate content used to produce the pumpable surfactant composition of this invention may be produced by the processes disclosed in U.S. Pat. Nos. 5,463,101, 5,550,274 and 5,554,781, as well as in EP Patent publication number EP 0 675,076 A2, especially as described in Example 18 of the EP publication.

The alkyl phosphate ester salts are prepared by mixing alkyl phosphate esters of high monoalkyl phosphate ester content with a suitable base. Suitable bases include sodium, potassium, lithium, and ammonium hydroxides and amines. Alkanolamines are preferred. Most preferred bases are diethanolisopropanolamine and diglycoldiisopropanolamine. The salts of the monoalkyl phosphate esters may be of any suitable base:acid molar ratio salts, such as those ranging from 0.7 to 1.7, as dictated by the properties of the salt.

Alkyl phosphate esters employed in forming the pumpable surfactant compositions of this invention are preferably produced from alcohols or mixtures of alcohols typically found in natural oils, for example, coconut or rapeseed oils, carbon chain length of about $C_8$ to $C_{22}$. Blends of linear and branched, saturated and unsaturated alcohols are possible. These alcohols are employed in the phosphation processes described in the aforementioned three patents/patent applications. As examples of such alcohols, there may be mentioned octanol, decanol, dodecanol, tetradecanol, hexadecanol and octadecanol or mixtures of alcohols, such as a commercially available blend of a mixture of about 0.1% decanol, about 68.3% dodecanol, about 27.6% tetradecanol and about 4.9% hexadecanol. For cleaning applications, the alkyl phosphate ester salts preferably comprise salts of predominately $C_{10}$ to $C_{12}$ alcohols or $C_8$ to $C_{12}$ alcohols. For lubricant applications, longer chain lengths, $C_{16}$ to $C_{22}$, with a higher degree of unsaturation would be more desirable. The alcohol or mixtures of alcohols may optionally be reacted with ethylene or propylene oxide to produce polyalkoxylate derivatives of low degree of alkoxylation. This is particularly useful for the longer chain linear aliphatic alcohols, which otherwise would produce phosphate esters of high melting points.

Preferred compositions of this invention have a mono- to di-alkyl phosphate molar ratio equal to or greater than 60:40 and have a solids content of about 60% by weight or more and exhibit one or more pumpable regions over a range of pH values for the surfactant composition, especially over the pH range of from about pH 5 to about pH 10 (measured as a 10 wt % aqueous solution. The pumpable compositions could be, for example, in a molecular solution or in a lamellar or micellar phase.

The residual phosphoric acid or residual alcohol content of the pumpable surfactant compositions of this invention will generally be less than 8% by weight, preferably less than 6% by weight, and more preferably less than 5% by weight of each residual component. Higher phosphoric acid content contributes to higher viscosity and non-ester salt content and the alcohols, having limited solubility in water, tend to separate or contribute haze to solutions which contain water.

Preferred compositions of this invention are pumpable or flowable at typical industrial use temperatures, e.g. about 45° C. or less, especially about 5° C. to about 45° C.

The total solids content of the pumpable aqueous surfactant composition will be about 60% or more, preferably about 60 wt % to about 100 wt %, and most preferably about 70 wt % to about 95 wt % by weight alkyl phosphate ester salt based upon the total weight of the composition. Total solids content of up to 100 wt % (no added solvent) are possible.

The surfactant composition optionally has a solvent added to enhance pumpability. Useful solvents include, but are not limited to, water, $C_{1-6}$ alcohols, alkylene glycols, and polyalkylene glycols. Useful alcohols include ethanol, n-propanol, isopropanol, n-butanol, 2-butoxyethanol, n-pentanol, isopentanol, and neopentanol. Glycols include propylene glycol, diethylene glycol, 1,4-butanediol and 1,6-hexanediol. The solvent may be present at up to about 40 wt %, more typically about 5 to about 40 wt %, and most typically at about 5 to about 30 wt % based upon the total weight of the composition. Compositions with 100% solids (zero percent (%) solvent) are within the scope of the present invention.

The present compositions may be incorporated into a variety of products or formulations for applications common to phosphate ester salts. Such applications include agricultural adjuvants, cosmetic and personal hygiene products, laundry and dish detergents, hard surface cleaners, emulsion polymerization additives, boundary or extreme pressure lubricants, lubricant additives (aqueous and oil based), anti-corrosion and anti-wear additives, metal degreasing, cutting or grinding aids, textile processing aids and ink jet printing fluid additives. The compositions are particularly useful as cleansing or emulsifying agents in products and formulations that contact the hair, skin and eyes. The compositions can be incorporated into a variety of product forms such as creams, lotions, gels, aerosols, sprays, ointments, solutions, suspensions, solids and towelettes or other woven and non-woven fabrics. Product application include skin cleansing, conditioning, moisturizing and protecting; anti-wrinkling; anti-aging; make-up removal; body and hair shampooing; bathing; cleaning gels for institutional and industrial use; household cleaning (hard surface) and dishwashing.

The novel stable, pumpable surfactant compositions of alkyl phosphate ester salts high in monoalkyl phosphate content of this invention are especially useful in cosmetic and personal care products because of their foaming abundancy, detergency and non-irritating properties, as well as their desirable foam density, stability and skin feel properties.

The invention is illustrated by the following non-limiting examples.

EXAMPLES

Alkanolamine salts of alkyl phosphate esters of the present invention were prepared.

All phosphate esters were prepared by phosphation of the selected alcohol or blend of alcohols in accordance with the processes described in European Patent publication EP 0 675,076 A2, particularly Example 18 thereof, with adjustment of reagent charges as appropriate for different alcohol molecular weights or intended ester product distributions. Preparation of phosphate esters is set forth below.

Preparation of Dodecyl Phosphate (Phosphate A)

A pre-dried reactor was charged, under essentially anhydrous conditions of a dry nitrogen blanket, with 343.5 lb. dodecanol which was heated to 35° C. to melt and provide an easily stirrable liquid. Polyphosphoric acid, (115%), 111.3 lb., was then added to the stirred liquor with cooling to maintain the temperature below 45° C. Stirring was continued for 30 min. to assure a homogenous solution. Phosphoric anhydride powder, 40.0 lb., was then added with cooling to maintain the temperature under 55° C. and the rapidly stirred mixture was heated to 80° C. and held at that temperature. Reaction progress was followed by the change in the second acid value and, after it had stabilized, 2.5 lb. water was added and stirring was continued at 80° C. for two hours. The batch was then cooled to 65° C., 1.0 lb. 35% hydrogen peroxide was added, the solution stirred for 30 minutes and readied for transfer. The product composition, determined by $^{31}P$, $^{13}C$ and $^{1}H$ nuclear magnetic resonance spectroscopy, was, by weight, 6.2% phosphoric acid, 76.0% mono(dodecyl) phosphate, 12.4% di(dodecyl) phosphate, 4.8% nonionics (residual alcohol) and 0.6% water (Karl-Fischer titration). Acid value 1 (first titration inflection point, pH~5.6) was 210.7 mg KOH/g sample.

Preparation of Dodecyl OE 1 Ethoxylate Phosphate (Phosphate B)

Using the same procedure as for phosphate A, 726 parts of dodecyl ethoxylate, hydroxyl no. 249.2, were combined with 187 parts 115% polyphosphoric acid and 80 parts phosphoric anhydride. The rapidly stirred mixture was cooked at 81° C. until the Acid Value 2 stabilized, then 5 parts water were added and the cook period continued for an additional two hours. The liquor was cooled to 65° C., 2 parts 35% hydrogen peroxide were added and stirring continued for 30 minutes. The batch was then cooled and transferred. The product composition was 6.6% phosphoric acid, 70.6% monoalkyl phosphates, 16.6% dialkyl phosphates, 5.7% nonionics, and 0.5% water. Acid value 1 was 181.6 mg KOH/g sample.

Preparation of Cocoalkyl OE 1 Ethoxylate Phosphate (Phosphate C)

Using the same procedure as in phosphate A above, 778 parts of a natural blend, comprising $C_{10}$ to $C_{16}$ alcohols ethoxylated with an average of one mole of ethylene oxide (OE 1), was combined with 153 parts 115% polyphosphoric acid and 62 parts phosphoric anhydride. The rapidly stirred mixture was cooked at 81° C. until the Acid Value 2 stabilized, then 5 parts water were added and the cook period continued for an additional two hours. The liquor was cooled to 65° C., 2 parts 35% hydrogen peroxide were added and stirring was continued for 30 minutes. The batch was then cooled and transferred. The product composition was 4.6% phosphoric acid, 71.6% monoalkyl phosphates, 17.0% dialkyl phosphates, 5.9% nonionics, and 0.9% water. The acid value 1 was 172.5 mg KOH/g sample.

Example 1

Preparation of an Anhydrous Solution of the Diethanolisopropanolamine Salt of Dodecyl Phosphate A clean 100 ml jar was charged with 12.10 g diethanolisopropanolamine, 8.00 g propylene glycol, and 13.76 g of Phosphate A. The mixture was capped and put into a 70° C. oven for 1 hr to melt the phosphate and provide a low viscosity, easily mixed liquid. It was then removed and placed on a shaker to mix for 1 hour to produce a homogenous, liquid salt composition, free from lumps. The product was then allowed to cool to room temperature. The resulting easily pourable, 70% solids salt solution, with an amine/phosphate molar ratio of 1.0, had a pH of 5.8 (as a 10% solution in water).

Example 2

Preparation of an Anhydrous Solution of the Diethanolisopropanolamine Salt of Dodecyl OE 1 Ethoxylate Phosphate In the same manner as for Example 1, 10.15 g diethanolisopropanolamine, 7.54 g propylene glycol, and 20.00 g of the dodecyl OE 1 ethoxylate phosphate (Phosphate B) were combined to prepare a homogeneous, easily pourable solution. The pH of the resulting 80% solids salt solution, with an amine/phosphate molar ratio of 1.00, was 5.6.

Example 3

Preparation of an Anhydrous Solution of the Diethanolisopropanolamine Salt of a Mixed Alcohol OE 1 Ethoxylate Phosphate In the same manner as for Example 1, 17.24 g diethanolisopropanolamine, 7.51 g propylene glycol, and 20.00 g of the mixed alcohol OE 1 ethoxylate phosphate (Phosphate C) were combined to prepare a homogeneous, easily pourable solution. The pH of the resulting 80% solids salt solution, with an amine/phosphate molar ratio of 1.00, was 6.0

Examples 4–6

Preparation of Anhydrous Phosphate Ester Salt Solutions with Higher Diethanolisopropanolamine Ratios In the same manner as for Examples 1–3, diethanolisopropanolamine was combined in propylene glycol with each phosphate ester to produce 80–100% solids clear, homogenous solutions. Results are shown in Tables 1 and 2.

Comparative Examples 1–3

Preparation of Anhydrous Phosphate Ester Salt Solutions from Symmetric Alkanolamines To clearly demonstrate the advantages of the invention, preparation of amine salt solutions of the most preferred phosphate ester, Phosphate B, using the symmetric alkanolamines (all three alkyl groups are the same), triethanolamine, triisopropanolamine and a 2:1 molar blend of TEA to TIPA to emulate the diethanolisopropanolamine (derived from 2 moles ethylene oxide, 1 mole propylene oxide) were attempted. The results, summarized in Tables 1 and 2, show that even under the more favorable, higher ratio of amine to phosphate ester and lower salt concentration, the salts recrystallized from the viscous solutions upon cooling to room temperature, hence were inferior and unsuitable for convenient handling and transfer.

TABLE 1

Compositions of Phosphate Ester Alkanolamine Salt Solutions

| Reactants | | Component Weight Ratios (g) | | | Molar Ratio |
|---|---|---|---|---|---|
| Amine | Phosphate | Amine | Ester | Solvent | Amine/Ester |
| Example | | | | | |
| 1 DEIPA | A | 12.10 | 13.76 | 8.00 | 1 |
| 2 DEIPA | B | 10.15 | 20.00 | 7.54 | 1 |
| 3 DEIPA | C | 17.24 | 20.00 | 7.51 | 1 |
| 4 DEIPA | A | 17.24 | 14.76 | 8.00 | 1.9 |
| 5 DEIPA | B | 43.97 | 46.03 | 0.00 | 1.8 |
| 6 DEIPA | C | 42.96 | 47.04 | 0.00 | 1.8 |
| Comparative Examples | | | | | |
| 1 TEA | B | 15.75 | 19.25 | 15 | 1.8 |
| 2 TIPA | B | 10.96 | 10 | 2.33 | 1.8 |
| 3 TEA/TIPA | B | 5.70/3.65 | 10 | 4.84 | 1.8 |

TABLE 2

Properties of Phosphate Ester Alkanolamine Salt Solutions

| Reactants | | pH (aq.) (10 Wt. %) | Solids (Wt. %) | Appearance |
|---|---|---|---|---|
| Amine | Phosphate | | | |
| Example | | | | |
| 1 DEIPA | A | 5.8 | 70 | Clear, Flowable |
| 2 DEIPA | B | 5.6 | 80 | Clear, Flowable |
| 3 DEIPA | C | 6 | 80 | Clear, Flowable |
| 4 DEIPA | A | 7.7 | 80 | Clear, Flowable |
| 5 DEIPA | B | 7.6 | 100 | Clear, Flowable |
| 6 DEIPA | C | 7.7 | 100 | Clear, Flowable |
| Comparative Examples | | | | |
| 1 TEA | B | 7.5 | 70 | Recrystalized |
| 2 TIPA | B | — | 90 | Recrystalized |
| 3 2TEA/1TIPA | B | — | 80 | Recrystalized |

Ross-Miles foam height tests were conducted on representative alkanolamine salts of alkyl phosphate esters to confirm that those of the present invention do not reduce foam formation or affect stability.

Solutions were prepared in deionized water at 1 wt % solids of the various salts of the phosphate ester A. Foam heights were determined at 23° C. Potassium salts with a potassium/phosphate molar ratio of both 0.9 (corresponding to pH 5.5) and 1.4 (corresponding to pH 7.6) were selected as target references because of the high degree of foam formation and stability they exhibit. The potassium salts gave initial and final foam heights of 175 mm.

The triethanolamine salt of Phosphate A of Comparative Example 1 and diethanolisopropanolamine salt of Phosphate A of the present invention (both had an amine/phosphate ratio of 1.0 and a pH of 5.8) both exhibited initial and final foam heights of 175 mm. Thus, the diethanolisopropanolamine salt of Phosphate A did not negatively impact foam formation or stability compared to phosphate esters of conventional salts. Diethanolisopropanolamine salts of phosphate esters are advantageous compared to those of conventional salts because they can be employed at high solids levels, which is preferred in skin cleansing applications.

Those skilled in the art will appreciate that modifications may be made to the invention without departing from the spirit thereof. Therefore, it is not intended that the scope of the invention be limited to the specific embodiments illustrated and described.

We claim:

1. A pumpable surfactant composition, comprising: a surfactant of a alkanolamine salt of an alkyl phosphate ester, the composition having a solids content of about 60% by weight or more, the alkyl phosphate ester alkanolamine salt having a structure according to the following formula I or formula II:

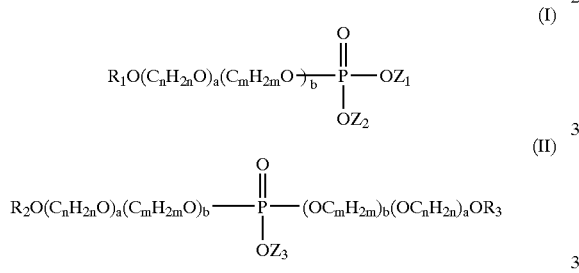

wherein $R_1$ to $R_3$ are, individually, selected from the group consisting of $C_{8-22}$ linear or branched alkyl alkenyl, alkaryl and aralkyl hydrocarbon moieties, which optionally may have carbocyclic rings; wherein the subscripts a and b, individually, may be the same or different and are integers from 0 to 8 with the proviso that the sum of the a and b is less than or equal to 8; wherein the subscripts n and m, individually, may be the same or different and are integers of from 2 to 4; wherein $Z_1$ and $Z_2$ are, individually, selected from the group consisting of hydrogen, alkali metal, ammonia and an alkanolamine according to the following formula III with the proviso that at least one of $Z_1$ and $Z_2$ must be an alkanolamine according to formula III; wherein $Z_3$ is an alkanolamine according to formula III; wherein formula III is according to the following:

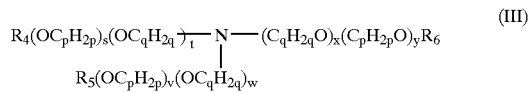

wherein $R_4$ to $R_6$ are, individually, selected from the group consisting of hydrogen and $C_{1-8}$ linear and branched alkyl, alkenyl, alkaryl and aralkyl hydrocarbon moieties, which optionally may have carbocyclic rings; wherein at least one of the three amine substituents is different from the other two and that, for at least one of the three amine substituents, the sum of s and t or v and w or x and y is equal to or greater than 1 and the corresponding R is hydrogen; wherein the subscripts p and q, individually, may be the same or different and are integers from 2 to 4; wherein the subscripts s, t, v, w, x, and y, individually, may be the same or different and are integers from 0 to 10 with the proviso that the sum of all the subscripts is less than or equal to 12.

2. The composition of claim 1, wherein the ratio of base to phosphate ranges from 0.7 to 1.7.

3. The composition of claim 1, which is flowable at a temperature between about 5° C. to 40° C.

4. The composition of claim 1, wherein the alkanolamine is selected from the group consisting of diethanolisopropanolamine, diglycoldiisopropanolamine, (2-(2-hydroxypropoxy)ethyl)diethanolamine, dimethylisopropanolamine, dibutylisopropanolamine, N-(2-hydroxypropyl) morpholine, methyldiethanolamine, ethyldiethanolamine, di(2-hydroxyethyl)aniline, (di-2-hydroxyethyl)toluidine, di (-2-hydroxyethyl)benzylamine, diethanolisopropylamine, and N-hydroxyethylimidazoline.

* * * * *